United States Patent
Womack

[19]

[11] Patent Number: 5,806,769
[45] Date of Patent: Sep. 15, 1998

[54] LAWN AND GARDEN FEEDING AND WATERING SYSTEM

[76] Inventor: Cheryl Ann Womack, 15551 Seven Pines, Baton Rouge, La. 70817

[21] Appl. No.: 821,859

[22] Filed: Mar. 21, 1997

[51] Int. Cl.⁶ ...................................................... B05B 7/26
[52] U.S. Cl. .............................. 239/310; 239/273; 248/53
[58] Field of Search ............................ 239/70, 303, 304, 239/306, 307, 309, 310, 317, 273; 248/75, 80, 83

[56] References Cited

U.S. PATENT DOCUMENTS

| | | |
|---|---|---|
| 1,596,752 | 8/1926 | Mitchell . |
| 2,349,505 | 5/1944 | Lohne ........................................ 248/85 |
| 2,657,096 | 10/1953 | Holmes ...................................... 299/75 |
| 2,720,371 | 10/1955 | Campbell ................................... 248/85 |
| 3,495,948 | 2/1970 | Long et al. ........................... 239/310 X |
| 4,333,493 | 6/1982 | Beiswinger et al. ................. 239/310 X |
| 4,340,179 | 7/1982 | Knapp ....................................... 239/310 |
| 4,901,890 | 2/1990 | Mivelaz ............................... 239/310 X |
| 5,096,123 | 3/1992 | Petitgoue ................................. 239/310 |
| 5,135,174 | 8/1992 | Chaplinsky .............................. 239/310 |
| 5,150,840 | 9/1992 | Grynkiewicz ........................... 239/305 |
| 5,188,294 | 2/1993 | Sealey et al. ............................ 239/310 |
| 5,199,645 | 4/1993 | Anderson et al. ....................... 239/310 |
| 5,335,690 | 8/1994 | Worth .................................. 239/310 X |
| 5,366,159 | 11/1994 | Childers ................................... 239/310 |
| 5,454,516 | 10/1995 | Smyrl ...................................... 239/305 |
| 5,507,945 | 4/1996 | Hansen .................................. 210/198.1 |

*Primary Examiner*—Lesley D. Morris
*Attorney, Agent, or Firm*—Joseph N. Breaux

[57] ABSTRACT

A lawn and garden feeding and watering system including a timed control valve connectable to a water supply by a first supply hose; a chemical dispensing unit in fluid connection with a discharge end of the timed control valve, the chemical dispensing unit having at least two chemical dispensing valve assemblies each having a piercing tube extending from a connecting opening; a length of soaker hose in fluid connection with a dispensing unit discharge end; and plurality of user positionable stand-off units each including a tubular hose flange having a central hose opening sized to slide over the soaker hose and a plurality of rigid stand-off members radially extending from the exterior surface of the hose flange. In use, the feeding and watering system is used in combination with a number of lawn chemical containing reservoir bottles. Each of the lawn chemical containing reservoir bottles includes a pierceable reservoir mouth cover that is pierced by the piercing tube of the chemical dispensing unit during connection of the chemical containing reservoir bottle to the chemical dispensing unit.

20 Claims, 3 Drawing Sheets

LAWN AND GARDEN FEEDING AND WATERING SYSTEM

TECHNICAL FIELD

The present invention relates to feeding and watering devices for lawns and gardens and more particularly to a lawn and garden feeding and watering system having a timed control valve, a chemical dispensing unit having at least two chemical dispensing valve assemblies each having a piercing tube extending from a connecting opening, a length of soaker hose, and plurality of user positionable stand-off units each including a tubular hose flange having a central hose opening sized to slide over the soaker hose and a plurality of stand-off members radially extending from the exterior surface of the hose flange.

BACKGROUND OF THE INVENTION

Lawns and gardens require regular maintenance, such as watering, and intermittent applications of chemical fertilizers and weed killers to stay in top condition. Thus, it can take considerable time and effort to maintain a lawn or garden in top condition. It would be a benefit, therefore, to have a simple feeding and watering system for watering and applying lawn chemicals to a lawn or garden. Although such systems exist, they are often expensive and complicated to install. It would, therefore, be a further benefit to have such a system that could be easily installed by a user and that could be inexpensively manufactured. Because the lawn or garden can require periodic applications of combinations of weed killers and fertilizers, it would also be a benefit to have such a system that included multiple, independently releasable lawn chemical reservoirs that contained sufficient lawn chemicals for multiple applications and that allowed a user to select which lawn chemicals would be applied during any given watering session. In addition, because the full strength lawn chemicals can pose a hazard to people, it would also be a benefit to have such a system that includes a mechanism for allowing a user to load the system with minimal contact with the full strength lawn chemicals.

SUMMARY OF THE INVENTION

It is thus an object of the invention to provide a lawn and garden feeding and watering system that is simple to operate.

It is a further object of the invention to provide a lawn and garden feeding and watering system that is inexpensive and easily installed by a user.

It is a still further object of the invention to provide a lawn and garden watering system that can be loaded with full strength lawn chemicals with minimal contact between the user and the full strength lawn chemicals.

It is a still further object of the invention to provide a lawn and garden feeding and watering system that includes multiple, independently releasable lawn chemical reservoirs that contain sufficient lawn chemicals for multiple applications and that allows a user to select which lawn chemicals will be applied during any given watering session.

It is a still further object of the invention to provide a lawn and garden feeding and watering system that includes a timed control valve, a chemical dispensing unit having at least two chemical dispensing valve assemblies each having a piercing tube extending from a connecting opening, a length of soaker hose, and plurality of user positionable stand-off units each including a tubular hose flange having a central hose opening sized to slide over the soaker hose and a plurality of stand-off members radially extending from the exterior surface of the hose flange.

It is a still further object of the invention to provide a lawn and garden feeding and watering system that accomplishes all or some of the above objects in combination.

Accordingly, a lawn and garden feeding and watering system is provided. The lawn and garden watering system includes a timed control valve connectable to a water supply by a first supply hose; a chemical dispensing unit in fluid connection with a discharge end of the timed control valve, the chemical dispensing unit having at least two chemical dispensing valve assemblies each having a piercing tube extending from a connecting opening; a length of soaker hose in fluid connection with a dispensing unit discharge end; and plurality of user positionable stand-off units each including a tubular hose flange having a central hose opening sized to slide over the soaker hose and a plurality of rigid stand-off members radially extending from the exterior surface of the hose flange. In use, the feeding and watering system is used in combination with a number of lawn chemical containing reservoir bottles. Each of the lawn chemical containing reservoir bottles includes a pierceable reservoir mouth cover that is pierced by the piercing tube of the chemical dispensing unit during connection of the chemical containing reservoir bottle to the chemical dispensing unit. Use of the piercing tubes in combination with a chemical reservoir bottle having a pierceable cover member allows the chemical dispensing unit to be provided with lawn care chemicals with minimal exposure to the user of the lawn chemicals in full strength form. In a preferred embodiment, the feeding and watering system further includes a number of chemical reservoir bottles having pierceable cover members. Although the pierceable cover member can be constructed of any material that will maintain the lawn chemical within the chemical reservoir bottle when the cover of the reservoir bottle is removed, the pierceable cover member is preferably constructed from a resilient self-sealing material, such as rubber, that allows the cover member to reseal itself when the piercing tube is withdrawn from the pierceable cover member.

In a preferred embodiment, a diversionary pathway is provided in parallel with the chemical dispensing unit to provide a second pathway between the discharge end of the timed control valve and the soaker hose. Flow through the diversionary pathway and the chemical dispensing unit is preferably controlled by a gated Y-diversionary valve to allow the user to select a water flow path around the chemical dispensing unit when only watering is required.

In addition, each of the user positionable stand-off units preferably includes a number of gripping bumps formed on the flange surface defining the central hose opening. The gripping bumps resist rotation of the tubular hose flange about the soaker hose and allow the user to more accurately position the stand-off members with respect to small plants. For instance, one stand-off member can be inserted into the ground in the fashion of a stake or two stand-off members can be positioned onto the ground surface to provide an A-frame support for the soaker hose above or adjacent to small plants and ground cover foliage. Each of the stand-off members is preferably between two and five inches in length.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF THE EXEMPLARY EMBODIMENT

Figure 1:
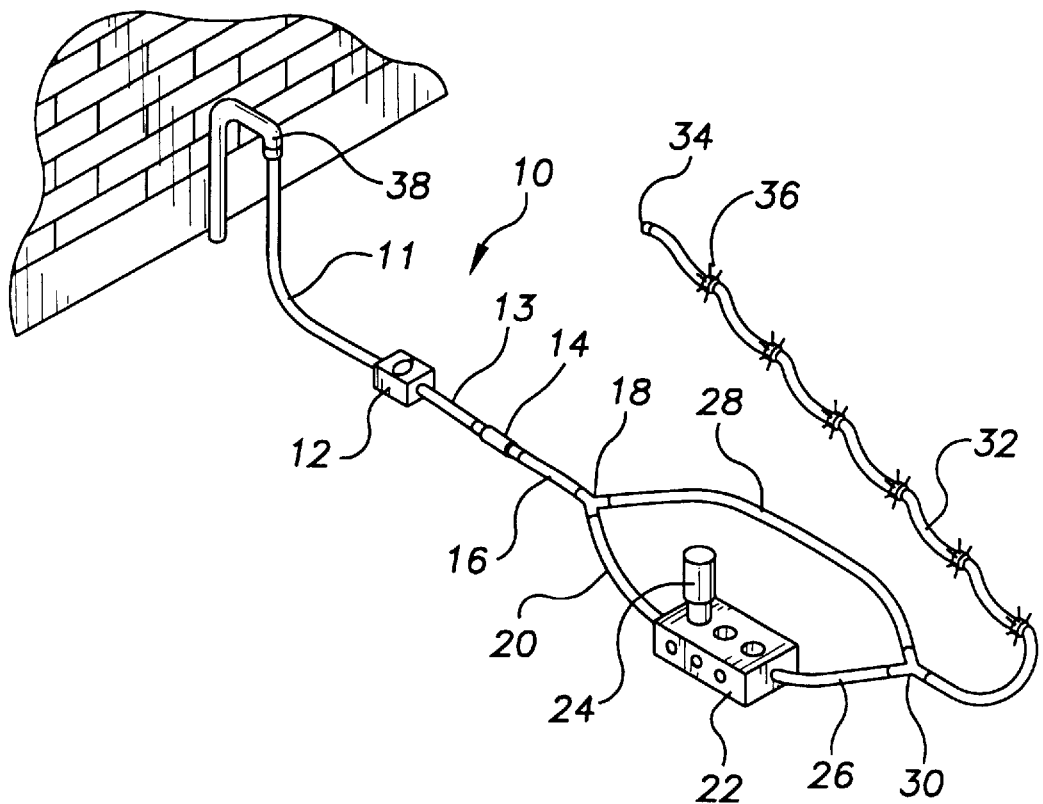
FIG. 1 is a perspective view of an exemplary embodiment of the lawn and garden feeding and watering system of the present invention showing, the first supply hose, the timed control valve, the one-way anti-backlash valve, the second supply hose, the gated Y-diversionary valve, the dispensing unit intake hose, the chemical dispensing unit, a chemical reservoir bottle, the dispensing unit discharge hose, the diversion hose, the Y-convergence fitting, the soaker hose, the soaker hose end stop, and a number of the user positionable stand-off units.

FIG. 1 shows an exemplary embodiment of the lawn and garden feeding and watering system of the present invention, generally designated by the numeral 10. System 10 includes a first supply hose 11, a timed control valve 12, a second supply hose 13, a one-way anti-backlash valve 14, a third supply hose 16, a gated Y-diversionary valve 18, a dispensing unit intake hose 20, a chemical dispensing unit 22, three identical chemical reservoir bottles 24 (only one shown), a dispensing unit discharge hose 26, a diversion hose 28, a Y-convergence fitting 30, a soaker hose 32, a soaker hose end stop 34, and six user positionable stand-off units 36. First supply hose 11, second supply hose 13, third supply hose 16, dispensing unit intake hose 20, dispensing unit discharge hose 26, and diversion hose 28 are lengths of conventional garden hose having conventional male and female hose couplings on the ends thereof. Soaker hose 32 is a length of conventional porous soaker hose. Soaker hose end stop 34 is a screw on type plug used to seal the end of soaker hose 32.

One-way anti-backlash valve 14 is a conventional gate-type flow inhibitor that prevents back-flow from chemical dispensing unit 22 into the water supply source 38, in this case a conventional water spigot. Y-convergence fitting 30 is a conventional molded plastic Y-fitting that is attachable between soaker hose 32, dispensing unit discharge hose 26, and diversion hose 28.

Figure 2:
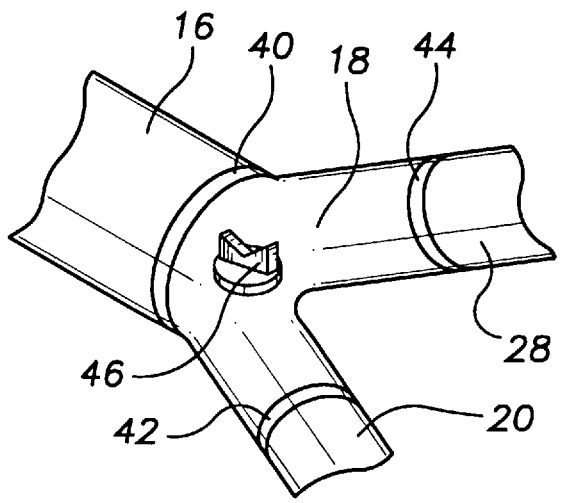
FIG. 2 is a detail perspective view of the gated Y-diversionary valve showing the valve intake coupling, the first and second valve discharge couplings, and the flow direction control valve actuator.

With reference to FIG. 2, gated Y-diversionary valve 18 is a conventional molded plastic directing valve attached at an intake coupling 40 to third supply hose 16, at a first discharge coupling 42 to dispensing unit intake hose 20 and at a second discharge coupling 44 to diversion hose 28. Y-diversionary valve 18 directs fluid flow from third supply hose 16 out through either dispensing unit intake hose 20 or diversion hose 28 depending on the position of a user positionable flow direction control valve actuator 46.

Figure 3:
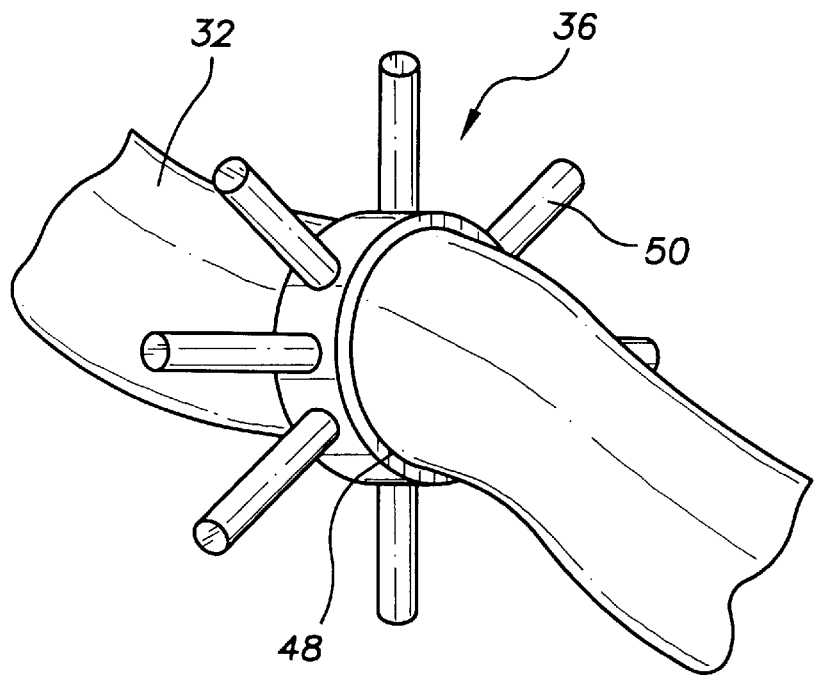
FIG. 3 is a perspective view of one of the user positionable stand-off units positioned onto a section of the soaker hose.
Figure 3A:
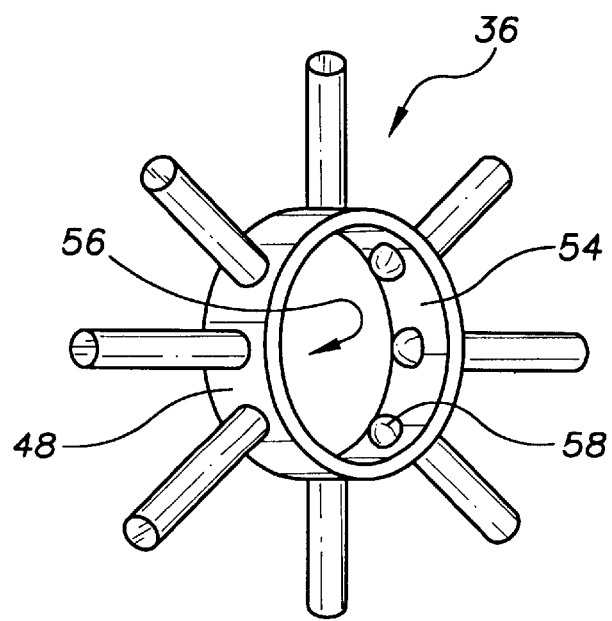
FIG. 3A is a perspective view of one of the stand-off units in isolation showing the tubular hose flange, the central hose opening, the gripping bumps, and eight stand-off members radially extending from the exterior surface of the hose flange.

With reference to FIG. 3, each of the user positionable stand-off units 36 is slidably positioned onto a section of soaker hose 32 to support soaker hose 32 above the ground surface. Stand-off units 36 are of identical molded plastic construction and each includes a tubular hose flange 48 and eight radially projecting four inch stand-off members 50. With reference to FIG. 3A, hose flange 48 has an interior surface 54 that defines a central hose opening 56. A number of raised, spherically shaped gripping bumps 58 are integrally formed on interior surface 54 and project into central hose opening 56.

Figure 4:
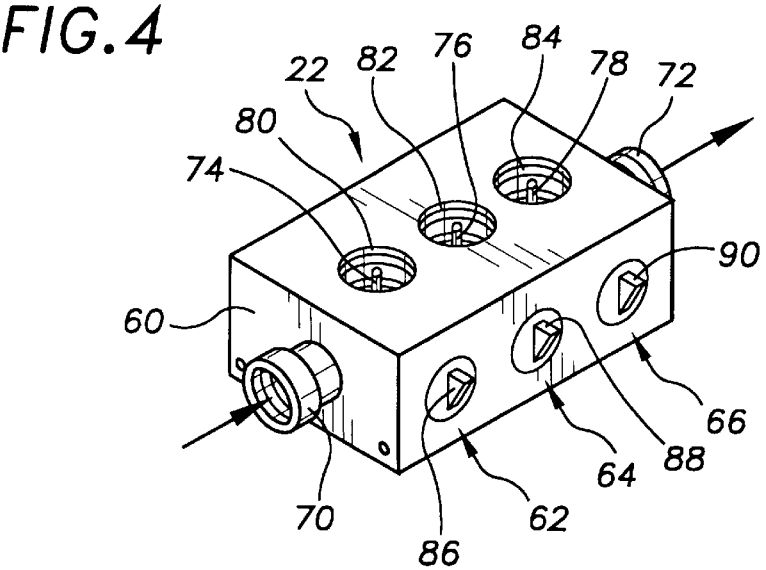
FIG. 4 is a perspective view of an exemplary embodiment of the chemical dispensing unit showing the supply intake fitting, the discharge fitting, and three chemical dispensing valve assemblies each having a piercing tube extending from a connecting opening of a threaded reservoir bottle coupling.
Figure 4A:
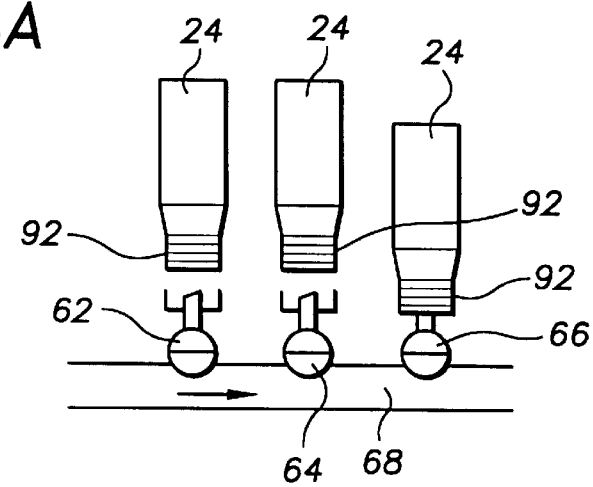
FIG. 4A is a schematic diagram of the chemical dispensing unit of FIG. 4 showing connection of the reservoir containers.

With reference to FIG. 4, chemical dispensing unit 22 has a molded plastic housing 60 containing three identical dispensing valve assemblies 62,64,66. With reference to FIG. 4A, each dispensing valve assembly 62,64,66 is in connection with a dispensing unit manifold 68, referring back to FIG. 4, having a supply intake fitting 70 and a discharge fitting 72. Each valve assembly 62,64,66 has a user positionable valve actuator 86,88,90 to open and close each valve assembly 62,64,66 as desired. Each dispensing valve assembly 62,64,66 has a piercing tube 74,76,78 extending from a connecting opening of a threaded reservoir bottle coupling 80,82,84.

Figure 4B:
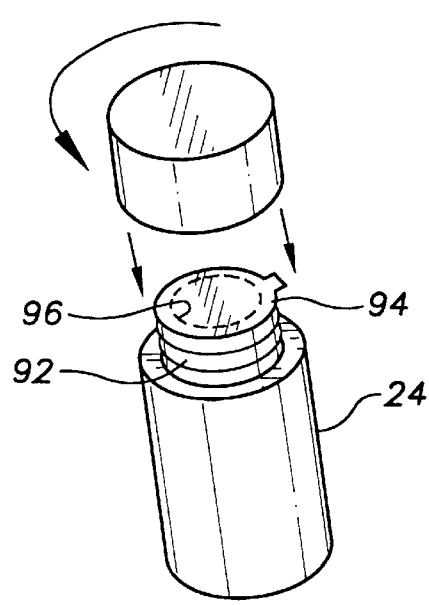
FIG. 4B is a perspective view of an exemplary chemical containing reservoir bottle showing the threaded rim and the pierceable reservoir mouth cover.

With reference to FIG. 4B, each chemical containing reservoir bottle 24 is of molded plastic construction and includes a threaded rim 92 sized and threaded for sealingly engaging a threaded reservoir bottle coupling 80,82,84 and a pierceable reservoir mouth cover 94 sealingly covering a reservoir mouth 96 (shown in dashed lines). In this embodiment, pierceable reservoir mouth cover 94 is constructed from resilient plastic having sufficient resiliency to reseal a hole formed therethrough by a piercing tube 74,76, 78. With general reference to the Figures, chemical containing reservoir bottles 24 are connected to chemical dispensing unit 22 by threading threaded rim 92 into a threaded reservoir bottle coupling 80,82,84. As threaded rim 92 is screwed in, a piercing tube 74,76,78 pierces pierceable cover member 94 providing lawn chemicals to system 10 through dispensing valve assemblies 62,64,66.

It can be seen from the preceding description that a lawn and garden feeding and watering system has been provided that is simple to operate; that is inexpensive; that is easily installed by a user; that can be loaded with full strength lawn chemicals with minimal contact between the user and the full strength lawn chemicals; that includes multiple, independently releasable lawn chemical reservoirs that contained sufficient lawn chemicals for multiple applications and that allows a user to select which lawn chemicals would be applied during any given watering session; that includes a timed control valve, a chemical dispensing unit having at least two chemical dispensing valve assemblies each having a piercing tube extending from a connecting opening, a length of soaker hose, and plurality of user positionable stand-off units each including a tubular hose flange having a central hose opening sized to slide over the soaker hose and a plurality of stand-off members radially extending from the exterior surface of the hose flange.

It is noted that the embodiment of the lawn and garden feeding and watering system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A lawn and garden feeding and watering system comprising:

a timed control valve connectable to a water supply by a first supply hose;

a chemical dispensing unit in fluid connection with a discharge end of said timed control valve, said chemical dispensing unit having at least two chemical dispensing valve assemblies each having a piercing tube extending from a connecting opening;

a length of soaker hose in fluid connection with a dispensing unit discharge end; and a plurality of user positionable stand-off units each including a tubular hose flange having a central hose opening sized to slide over said soaker hose and a plurality of rigid stand-off members radially extending from an exterior surface of said hose flange.

2. The lawn and garden feeding and watering system of claim 1, further including:

a plurality of lawn chemical containing reservoir bottles, each of said lawn chemical containing reservoir bottles including a pierceable reservoir mouth cover that is pierceable by one of said piercing tubes of said chemical dispensing unit during connection of said chemical containing reservoir bottle to said chemical dispensing unit.

3. The lawn and garden feeding and watering system of claim 2, wherein:

said pierceable cover member is constructed from a resilient self-sealing material.

4. The lawn and garden feeding and watering system of claim 1 wherein:

a diversionary pathway is provided in parallel with said chemical dispensing unit to provide a second pathway between said discharge end of said timed control valve and said soaker hose.

5. The lawn and garden feeding and watering system of claim 4 wherein:

flow through said diversionary pathway and said chemical dispensing unit is controlled by a gated Y-diversionary valve.

6. The lawn and garden feeding and watering system of claim 1 wherein:

each of said stand-off units includes a number of gripping bumps formed on a flange surface defining said central hose opening.

7. The lawn and garden feeding and watering system of claim 1 wherein:

each of said stand-off members is between two and five inches in length.

8. The lawn and garden feeding and watering system of claim 2 wherein:

a diversionary pathway is provided in parallel with said chemical dispensing unit to provide a second pathway between said discharge end of said timed control valve and said soaker hose.

9. The lawn and garden feeding and watering system of claim 8 wherein:

flow through said diversionary pathway and said chemical dispensing unit is controlled by a gated Y-diversionary valve.

10. The lawn and garden feeding and watering system of claim 2 wherein:

each of said stand-off units includes a number of gripping bumps formed on a flange surface defining said central hose opening.

11. The lawn and garden feeding and watering system of claim 2 wherein:

each of said stand-off members is between two and five inches in length.

12. The lawn and garden feeding and watering system of claim 3 wherein:

a diversionary pathway is provided in parallel with said chemical dispensing unit to provide a second pathway between said discharge end of said timed control valve and said soaker hose.

13. The lawn and garden feeding and watering system of claim 12 wherein:

flow through said diversionary pathway and said chemical dispensing unit is controlled by a gated Y-diversionary valve.

14. The lawn and garden feeding and watering system of claim 3 wherein:

each of said stand-off units includes a number of gripping bumps formed on a flange surface defining said central hose opening.

15. The lawn and garden feeding and watering system of claim 3 wherein:

each of said stand-off members is between two and five inches in length.

16. The lawn and garden feeding and watering system of claim 4 wherein:

each of said stand-off units includes a number of gripping bumps formed on a flange surface defining said central hose opening.

17. The lawn and garden feeding and watering system of claim 4 wherein:

each of said stand-off members is between two and five inches in length.

18. The lawn and garden feeding and watering system of claim 5 wherein:

each of said stand-off units includes a number of gripping bumps formed on a flange surface defining said central hose opening.

19. The lawn and garden feeding and watering system of claim 5 wherein:

each of said stand-off members is between two and five inches in length.

20. The lawn and garden feeding and watering system of claim 6 wherein:

each of said stand-off members is between two and five inches in length.

* * * * *